United States Patent
Liao

(10) Patent No.: US 7,422,265 B1
(45) Date of Patent: Sep. 9, 2008

(54) UPPER COVER SUPPORT STRUCTURE FOR AN AUTOMOBILE REAR LOADING PLATFORM

(75) Inventor: Ming-Te Liao, Taipei (TW)

(73) Assignee: Yi-Tang Enterprise Ltd., Taipei (TW)

( * ) Notice: Subject to any disclaimer, the term of this patent is extended or adjusted under 35 U.S.C. 154(b) by 0 days.

(21) Appl. No.: 11/713,095

(22) Filed: Mar. 2, 2007

(51) Int. Cl.
*B60P 7/02* (2006.01)

(52) U.S. Cl. ............... 296/100.1; 296/100.08; 49/344; 49/345

(58) Field of Classification Search ......... 296/174, 296/100.02, 100.06, 100.08, 100.1, 100.17, 296/76, 107.08; 16/250, 251; 49/344, 345, 49/339, 340
See application file for complete search history.

(56) References Cited

U.S. PATENT DOCUMENTS

| | | | | |
|---|---|---|---|---|
| 4,101,162 A * | 7/1978 | Koehn | ............. | 296/100.1 |
| 5,094,499 A * | 3/1992 | Simone, Jr. | ............. | 296/100.1 |
| 5,102,185 A * | 4/1992 | Lake | ............. | 296/165 |
| 5,104,175 A * | 4/1992 | Enninga | ............. | 296/100.1 |
| 5,681,074 A * | 10/1997 | Christensen | ............. | 296/100.08 |
| RE36,135 E * | 3/1999 | O'Brian | ............. | 296/98 |
| 5,988,728 A * | 11/1999 | Lund et al. | ............. | 296/100.03 |
| 6,186,580 B1 * | 2/2001 | Nothem et al. | ............. | 296/185.1 |
| 6,543,834 B2 * | 4/2003 | Sisson | ............. | 296/100.1 |
| 6,702,360 B1 * | 3/2004 | Santos et al. | ............. | 296/100.07 |
| 2002/0005651 A1 * | 1/2002 | Young et al. | ............. | 296/100.1 |
| 2006/0163907 A1 * | 7/2006 | Queveau et al. | ............. | 296/107.08 |
| 2007/0284907 A1 * | 12/2007 | Yue | ............. | 296/100.06 |

* cited by examiner

*Primary Examiner*—Jason S Morrow
(74) *Attorney, Agent, or Firm*—Troxell Law Office, PLLC

(57) ABSTRACT

A support structure for an upper cover of an automobile rear loading platform, which is installed on two sides between a rear end portion of an automobile rear loading platform and an upper cover of the rear loading platform, wherein a base mount is fixed to a bottom plate of the rear loading platform, and a supporting arm is pin connected to the base mount. Another end of the supporting arm is pin connected to a suspension arm, and another end of the suspension arm is pin connected to a fixing mount that enables fixing to a bottom portion of the upper cover. An oil pressure rod is pin configured between the aforementioned supporting arm and the base mount, thereby providing support therebetween. Accordingly, good support and buffering effectiveness is achieved when opening and closing the upper cover.

4 Claims, 5 Drawing Sheets

UPPER COVER SUPPORT STRUCTURE FOR AN AUTOMOBILE REAR LOADING PLATFORM

BACKGROUND OF THE INVENTION (a) Field of the Invention

The present invention relates to an upper cover support structure for an automobile rear loading platform, and more particularly to a support structure that can be installed between a rear loading platform of a pickup and an upper cover of the rear loading platform to increase fixedness and steadiness when opening and closing the upper cover, and achieve good support and buffering effectiveness.

(b) Description of the Prior Art

The automobile is an extremely convenient means of transportation, especially a pickup which is not only provided with functionality of a saloon car to carry passengers, but also combines the extreme convenience of a rear loading platform that enables carrying goods. Moreover, in order to prevent goods disposed within the rear loading platform from getting wet by rain or from getting stolen when the pickup is parked outdoors, and taking into consideration the aesthetic appearance of the entire design of the pickup, thus, upper cover structures that enable covering the rear loading platform have been designed by interested operators, wherein two sides of a front portion of the upper cover are respectively joined to the rear loading platform using hinges, and oil pressure rods connected to side plates of the rear loading platform are respectively located at appropriate positions on left and right sides of the upper cover, thereby enabling steady support of the upper cover of the rear loading platform when opening. However, the hinges on left and right sides at the front end portion are the only fixed pivots about which the extremely large size of the upper cover of the rear loading platform rotates, and thus the 8 feet and 6 feet length specifications of the rear loading platform result in the extremely long lengths of the upper cover of the rear loading platform easily causing extremely unstable swaying from side to side of the upper cover when opening and closing, thereby easily resulting in damage to component members, and raising concern over safety. Hence, there is a need for improvement in prior art.

In light of the aforementioned shortcomings of prior art, and with the intention to resolve such, the inventor of the present invention has meticulously carried out extensive study and research in structural design to provide a more stable and safe upper cover support structure for a rear loading platform for use by the general consumer.

SUMMARY OF THE INVENTION

A primary objective of the present invention is to provide an upper cover support structure for an automobile rear loading platform which enables increasing steadiness and safety when opening and closing the upper cover while at the same time achieve good support and buffering effectiveness.

In order to achieve the aforementioned objective, the support structure for an upper cover of an automobile rear loading platform as described by the present invention and installed on two sides between a rear end portion of an automobile rear loading platform and an upper cover thereof comprises a base mount, a supporting arm, an suspension arm, a fixing mount and an oil pressure rod. The base mount enables fixing to the rear loading platform, and the supporting arm is pin connected to the base mount. A support mount is located at a bottom portion of another end of the supporting arm, and an end portion of the supporting arm is pin connected to the suspension arm. A fixing mount that enables fixing to a bottom portion of the upper cover is pin connected to another end of the suspension arm, and the oil pressure rod is pin configured between the aforementioned support mount of the supporting arm and the base mount, thereby providing support therebetween. Accordingly, when opening and closing the upper cover of the rear loading platform, hinges installed at two sides of the front portion of the upper cover serve as fixed pivots about which the upper cover rotates, thereby enabling achieving good support and buffering effectiveness, which increases steadiness and safety when opening and closing the upper cover.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
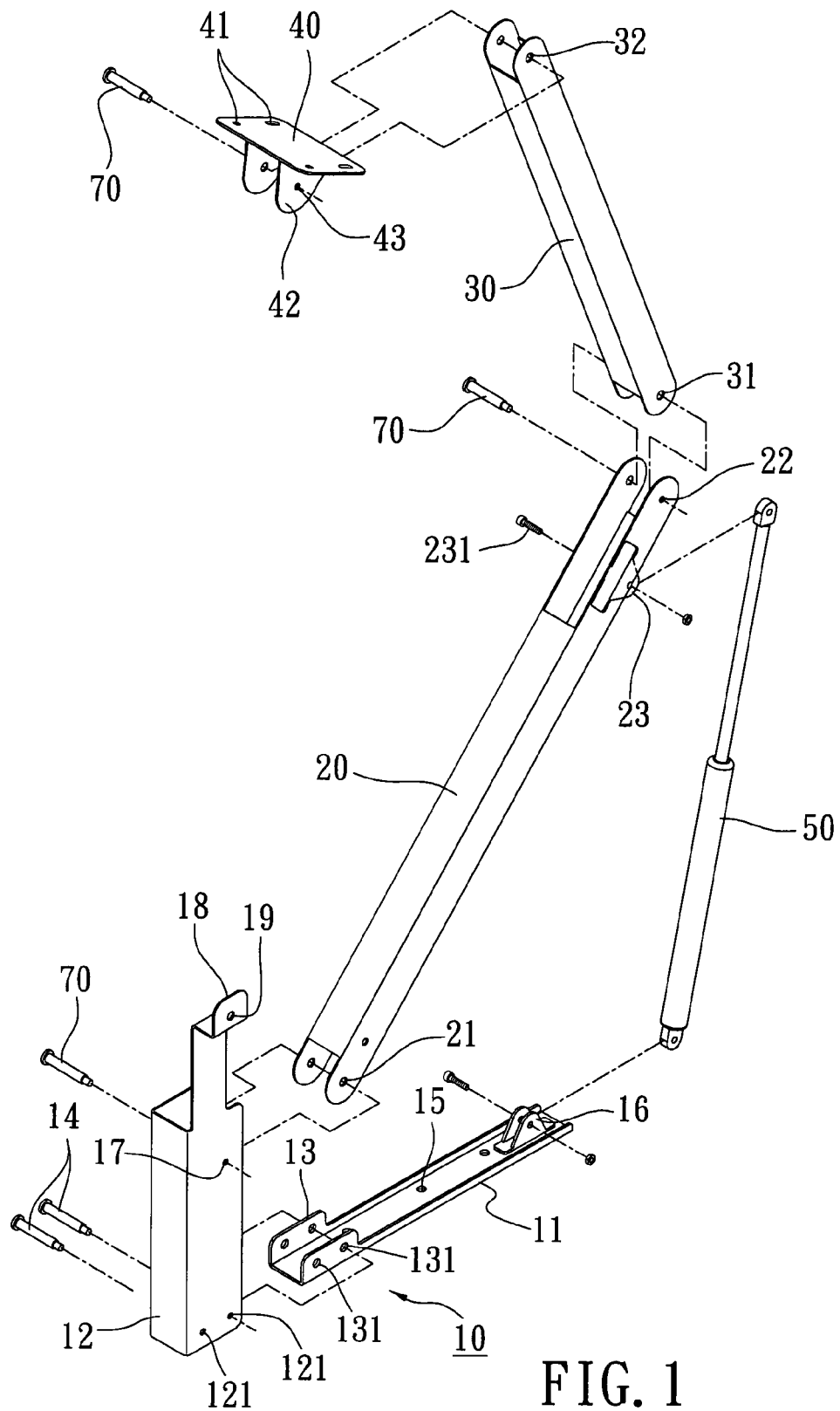
FIG. 1 shows an exploded schematic view according to the present invention.
Figure 2:
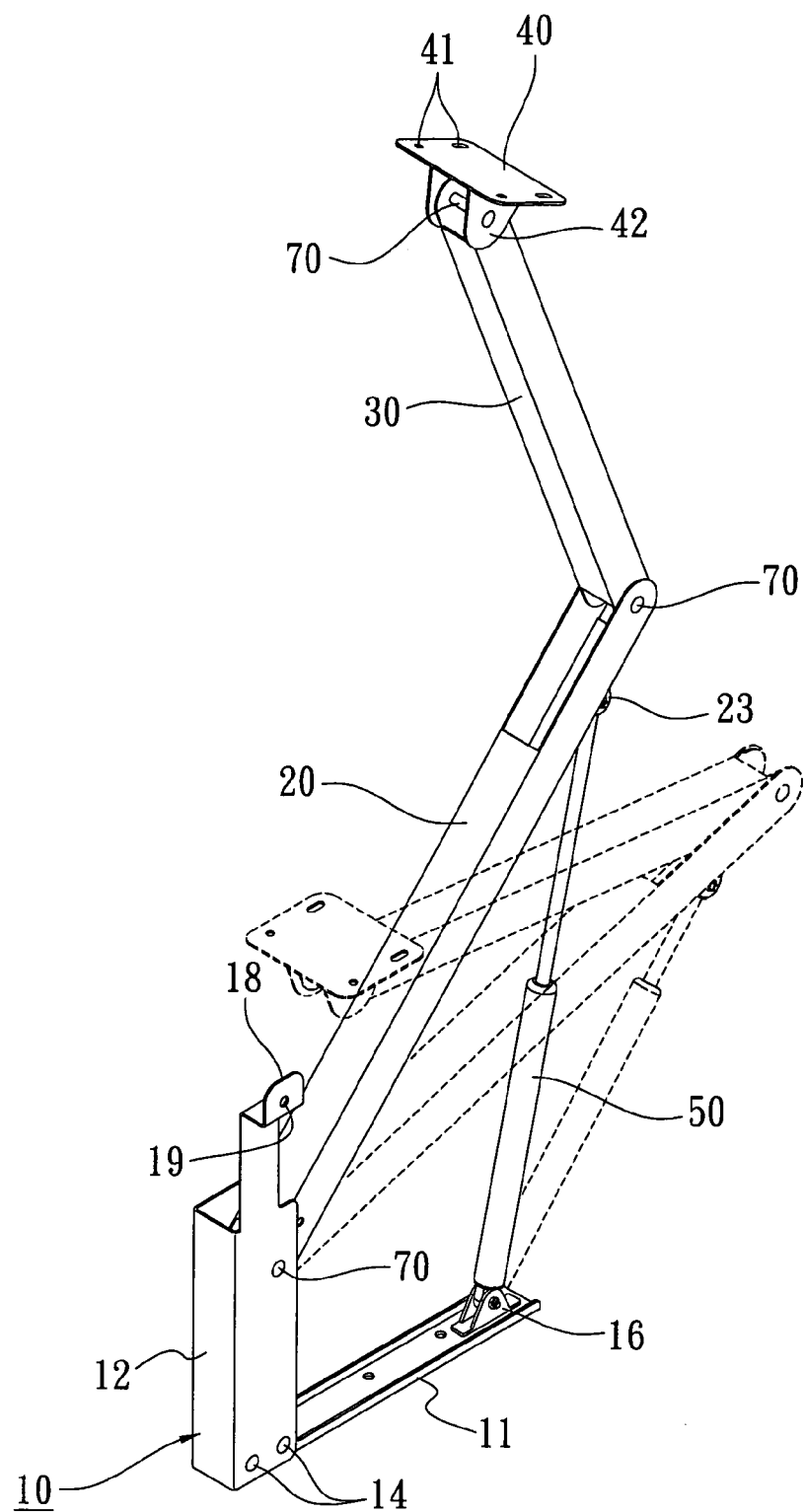
FIG. 2 shows an elevational schematic view according to the present invention.
Figure 3:
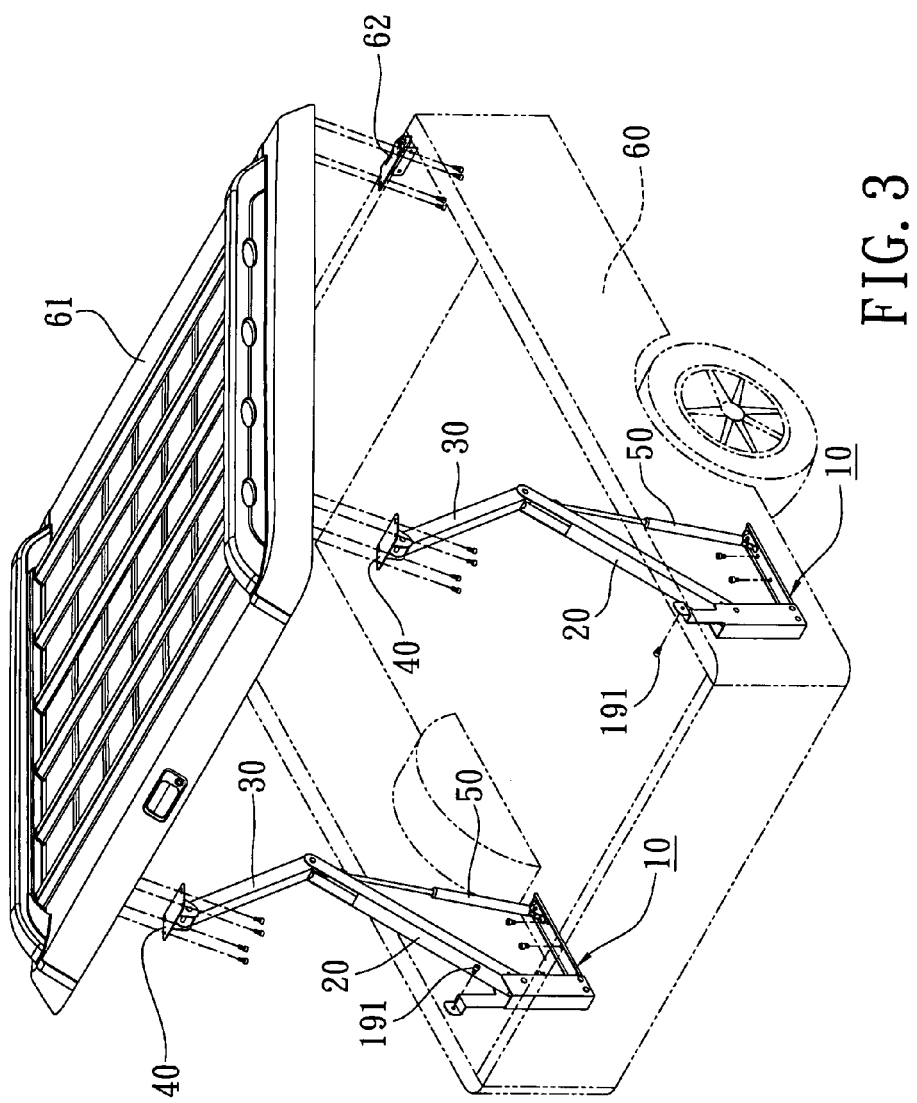
FIG. 3 shows a schematic view of the present invention installed.

Referring to FIGS. 1 to 3, which shows a support structure for an upper cover of an automobile rear loading platform installed on two sides between a rear end portion of an automobile rear loading platform 60 and a bottom portion of an upper cover 61, wherein each of the support structures is primarily structured to comprise a base mount 10, a supporting arm 20, an suspension arm 30, a fixing mount 40 and an oil pressure rod 50.

The base mount 10 of an embodiment of the present invention is structured to comprise a horizontal plate 11 and a vertical frame 12. A joining portion 13 is located at a rear end of the horizontal plate 11, and the joining portion 13 is joined to the vertical frame 12 using two joining pins 14. When joining together the joining portion 13 and the vertical frame 12, the joining pins 14 are made to respectively penetrate holes 121 at a bottom portion of the vertical frame 12 and holes 131 of the joining portion 13 at the rear end of the horizontal plate 11, thereby fixedly securing the horizontal plate 11 to the vertical frame 12. A plurality of fixing holes 15 are defined in the horizontal plate 11, and screw members are used to fasten into the fixing holes 15 to enable fixedly securing to a base plate of the rear loading platform 60, moreover, a support mount 16 is located at a front end of the horizontal plate 11. Furthermore, a through hole 17 is defined at a specific height position in the vertical frame 12, and an extended folded plate 18 extends from a top end of the vertical frame 12, moreover, a fixing hole 19 defined in the extended folded plate 18 is used for a screw 191 to penetrate therethrough and enable fixedly securing to a side plate of the rear loading platform 60 (see FIG. 3).

Pivot holes 21 are respectively defined in sides at a lower end of the supporting arm 20, and pivot holes 22 are respectively defined in sides at an upper end of the supporting arm 20. A pin 70 is used to pin connect the lower end of the supporting arm 20 to the vertical frame 12 by penetrating the through hole 17 of the vertical frame 12 and the pivot holes 21 of the supporting arm 20. A support mount 23 is located at a bottom portion of the upper end of the supporting arm 20, and a pin hole is defined in the support mount 23. The oil pressure rod 50 is joined to the support mount 23 by means of a screw 231 penetrating the pin hole of the support mount 23 and a hole of the oil pressure rod 50. The lower end of the aforementioned supporting arm 20 can be fixedly positioned to a side plate of the rear loading platform 60, and thus not indirectly fixed to the side plate of the rear loading platform 60 through the vertical frame 12 as depicted in the embodiment of the diagrams. Height of the pivot point at the lower end of the supporting arm 20 and length of the supporting arm 20 can be discretionarily changed, and such functional ability to change height of the pivot point and length of the supporting arm 20 enables changing opening angle of the upper cover 61 of the rear loading platform 60.

Shaft holes 31 are defined at a lower end of the suspension arm 30, and shaft holes 32 are defined at an upper end of the suspension arm 30, and a pin 70 is used to penetrate the shaft holes 31 at the lower end of the suspension arm 30 and the pivot holes 22 of the supporting arm 20, thereby pin connecting the suspension arm 30 to the supporting arm 20.

A plurality of fixing holes 41 defined in a plate body of the fixing mount 40 enable securing the fixing mount to a bottom portion of the upper cover 61 (see FIG. 3). Connecting portions 42 are located on a bottom portion of the fixing mount 40, and through holes are respectively defined in the connecting portions 42. A pin 70 is similarly used to penetrate the connecting portions 42 and the shaft holes 32 of the suspension arm 30, thereby pin connecting the suspension arm 30 to the connecting portions 42.

The oil pressure rod 50 is pin configured between the support mount 16 of the base mount 10 and the support mount 23 of the supporting arm 20, thereby achieving a good support function and buffering effectiveness when lifting the upper cover 61 of the automobile rear loading platform 60.

Figure 4:
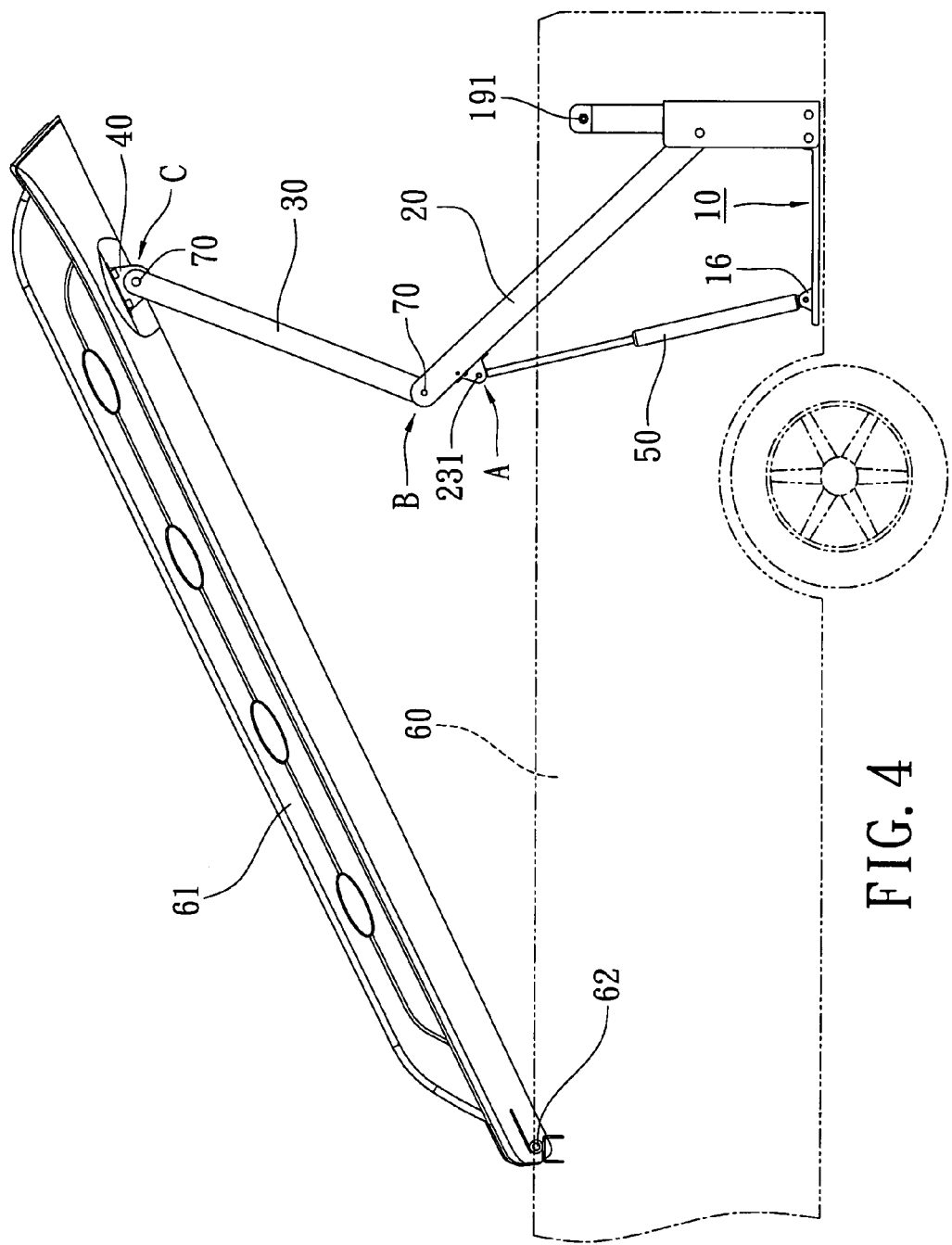
FIG. 4 shows a schematic view of the present invention when opened.
Figure 5:
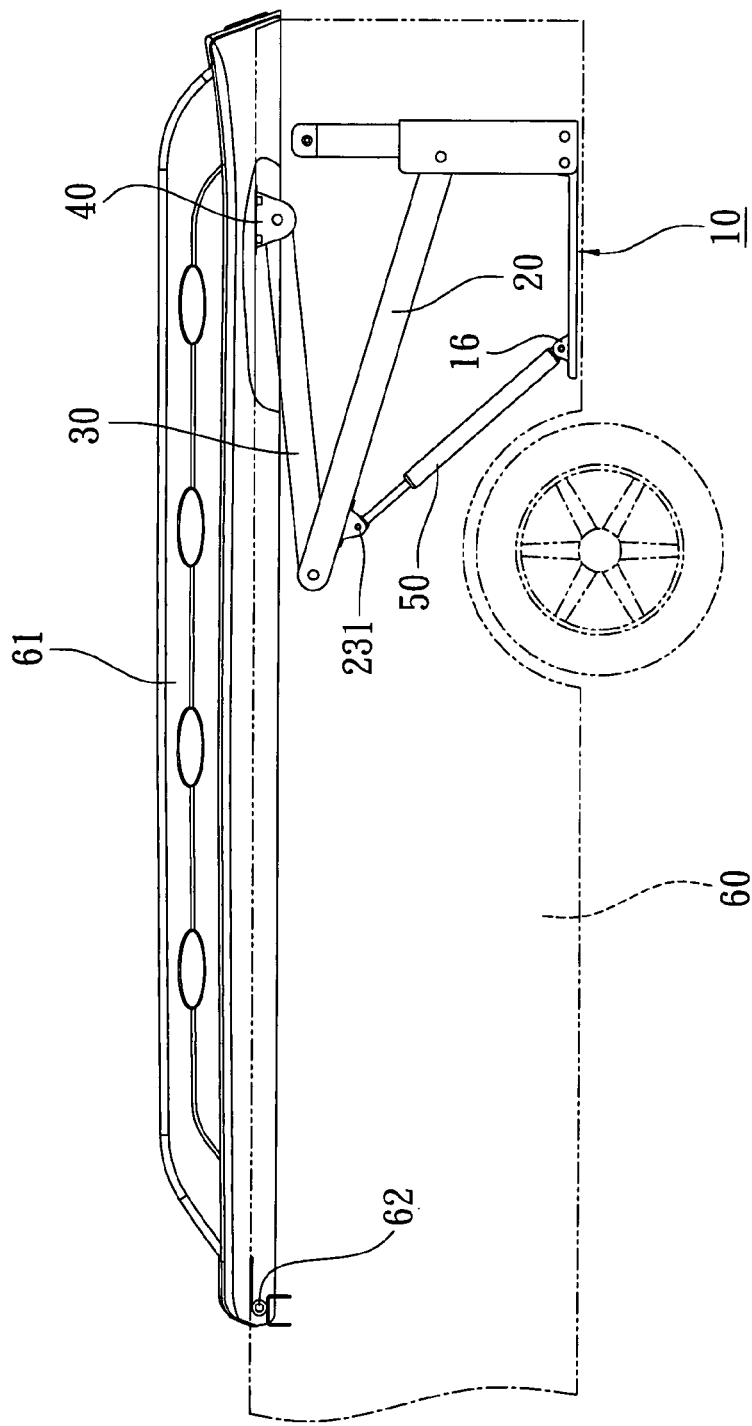
FIG. 5 shows a schematic view of the present invention when closed.

Referring to FIGS. 3 to 5, when using the support structure, the base mount 10 of each of the support structures is respectively fixed to the two side base plates at the rear end of the automobile rear loading platform 60, furthermore, the fixing mount 40 of each of the support structures is fixedly joined to the upper cover 61. Left and right sides of the front end portion of the upper cover 61 are respectively fixed to a front plate of the rear loading platform 60 using hinges 62. Accordingly, when lifting the upper cover 61, the upper cover 61 can be rotated about the hinges 62 at the front end acting as pivots, and the support structures as configured in the present invention are used to enable steady opening of the rear end portion of the upper cover 61 to a predetermined height. Moreover, use of the oil pressure rods 50 of the support structures enables providing good support.

Referring to FIG. 4, which shows the multiply connected rods configuration of the present invention, wherein the bottom end of the oil pressure rod 50 is fixed to the support mount 16, and when a pivot A at the top end of the oil pressure rod 50 is in a supporting state, then the multiply connected rods structure is raised by means of a pivot B at the upper end of the supporting arm 20, thereby indirectly raising the upper cover 61 by means of a pivot C at the upper end of the suspension arm 30 connected to the upper cover 61, thus achieving effort-saving lifting of the upper cover 61 and providing good supporting effectiveness. Furthermore, when closing the upper cover 61, compressive force of the oil pressure rods 50 is used to achieve good buffering effectiveness and steady closing of the upper cover 61.

In conclusion, the present invention is assuredly able to achieve anticipated objectives, and provides a safe, stable upper cover support structure for an automobile rear loading platform that is provided with good support and buffering effectiveness.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A support structure for an upper cover of an automobile rear loading platform, which is installed on two sides between a rear end portion of an automobile rear loading platform and an upper cover, comprising at least a base mount, a supporting arm, an suspension arm, a fixing mount and an oil pressure rod, wherein:
   the base mount is fixed to a bottom plate of the automobile rear loading platform;
   a lower end of the supporting arm is pin connected to a side plate of the rear loading platform, and an upper end of the supporting arm is pin connected to a lower end of the suspension arm;
   the lower end of the suspension arm is pin connected to the upper end of the supporting arm, and the upper end of the suspension arm is joined to a bottom end of the upper cover of the rear loading platform;
   the fixing mount is pin connected to the upper end of the suspension arm and fixed to a bottom portion of the upper cover of the rear loading platform;
   the oil pressure rod is pin configured between the supporting arm and the base mount.

2. The support structure for an upper cover of an automobile rear loading platform according to claim 1, wherein the lower end of the supporting arm is pin connected to the base mount of the rear loading platform.

3. The support structure for an upper cover of an automobile rear loading platform according to claim 2, wherein the base mount comprises a horizontal plate and a vertical frame, a support mount is located on the horizontal plate, and a through hole is defined in the vertical frame to enable pin connecting the supporting arm thereto.

4. The support structure for an upper cover of an automobile rear loading platform according to claim 3, wherein a plurality of fixing holes are defined in the horizontal plate of the base mount, a folded plate extends from a top end of the vertical frame, and a fixing hole is defined in the folded plate.

* * * * *